(12) United States Patent
Zakoji

(10) Patent No.: US 7,843,628 B2
(45) Date of Patent: Nov. 30, 2010

(54) LIGHT SOURCE DEVICE AND PROJECTOR

(75) Inventor: Makoto Zakoji, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 12/407,051

(22) Filed: Mar. 19, 2009

(65) Prior Publication Data
US 2009/0244694 A1 Oct. 1, 2009

(30) Foreign Application Priority Data
Apr. 1, 2008 (JP) ............................. 2008-094758

(51) Int. Cl.
*G02F 1/135* (2006.01)
(52) U.S. Cl. ........................................ 359/326; 372/22
(58) Field of Classification Search ......... 359/326–332; 385/122; 372/21, 22
See application file for complete search history.

(56) References Cited

U.S. PATENT DOCUMENTS 5,963,359 A * 10/1999 Shinozaki et al. ........... 359/326
6,697,186 B2 * 2/2004 Kawase et al. .............. 359/330

FOREIGN PATENT DOCUMENTS

JP 06-233778 8/1994

* cited by examiner

*Primary Examiner*—Daniel Petkovsek
(74) *Attorney, Agent, or Firm*—Workman Nydegger

(57) ABSTRACT

A light source device includes: a first light source unit and a second light source unit emitting light; and a wavelength conversion element converting wavelengths of lights emitted from the first light source unit and from the second light source unit. Chief ray of light emitted from the first light source unit and transmitted through the wavelength conversion element is not parallel with chief ray of light emitted from the second light source unit and transmitted through the wavelength conversion element.

15 Claims, 9 Drawing Sheets

LIGHT SOURCE DEVICE AND PROJECTOR

BACKGROUND

1. Technical Field

The present invention relates to a light source device and a projector, and particularly to a technology of a light source device having a wavelength conversion element.

2. Related Art

Recently, a technology of a light source device of a projector which uses laser beam source has been proposed. Compared with a UHP lamp used as light source for the projector in related art, laser beam source has characteristics such as preferable color rendering properties, long life, and immediate turning on and off. For displaying images using laser beam source currently developed, light is supplied from a plurality of laser beam sources in some cases so as to obtain a sufficient amount of light. For example, JP-A-6-233778 proposes a technology of combining a plurality of laser beam sources. According to the technology disclosed in JP-A-6-233778, lights emitted from the plural laser beam sources and introduced through fibers are combined by a light combining unit.

The laser beam source currently known are a type which emits fundamental light without changing wavelength, and a type which converts wavelength of fundamental light by using a wavelength conversion element. By using the wavelength conversion element, laser beams having desired wavelength and sufficient light amount can be supplied from a general-purpose light source easily available. When employing the technology disclosed in JP-A-6-233778, the light source device requires the same number of wavelength conversion elements as that of the laser beam sources. By the requirement of the plural wavelength conversion elements, the manufacturing cost and the size of the light source device increase.

SUMMARY

It is an advantage of some aspects of the invention to provide a light source device which obtains high outputs and is compact and manufactured at low cost, and a projector including the light source device.

A light source device according to a first aspect of the invention includes: a first light source unit and a second light source unit emitting light; and a wavelength conversion element converting wavelengths of lights emitted from the first light source unit and from the second light source unit. Chief ray of light emitted from the first light source unit and transmitted through the wavelength conversion element is not parallel with chief ray of light emitted from the second light source unit and transmitted through the wavelength conversion element.

The light source device having this structure which includes the first light source unit and the second light source unit can obtain higher outputs than those of a light source having a single light source unit. Light from the first light source unit and light from the second light source unit travel in different directions through polarization inverted structures provided with a predetermined pitch. The wavelength conversion element converts wavelength of light satisfying phase matching condition according to traveling direction of light passing through the polarization inverted structures. The light source device can be made compact and manufactured at low cost by converting wavelengths of lights from the first light source unit and the second light source unit using the common wavelength conversion element. Thus, increase in outputs and reduction of size and manufacturing cost of the light source device can be achieved.

It is preferable that the first light source unit and the second light source unit emit lights having different wavelengths. The light source device having this structure emits lights having different wavelengths by converting different wavelengths of light from the first light source unit and from the second light source unit. Thus, speckle noise can be reduced by combining plural laser beams having appropriate wavelength difference and releasing the combined light.

It is preferable that the wavelength conversion element has a first polarized layer and a second polarized layer disposed side by side in a particular direction, and that at least either the first light source unit or the second light source unit directs light in a direction different from the particular direction in the wavelength conversion element. When light traveling in a direction different from the particular direction is supplied, the wavelength conversion element converts wavelength of the light having wavelength different from that of light traveling in the particular direction. The light source device emits lights from the first light source unit and from the second light source unit after wavelength conversion using the wavelength conversion element by appropriately setting the traveling directions of lights from the first light source unit and from the second light source unit in the wavelength conversion element.

It is preferable that light emitted from the first light source unit and light emitted from the second light source unit cross each other inside the wavelength conversion element. In this structure, lights from the first light source unit and from the second light source unit can travel in different directions in the wavelength conversion element.

It is preferable that the first light source unit and the second light source unit supply lights to different surfaces of the wavelength conversion element. In this structure, at least either light from the first light source unit or light from the second light source unit can travel in directions different from the particular direction in the wavelength conversion element.

It is preferable that the first light source unit and the second light source unit supply lights to adjoining surfaces of the wavelength conversion element. In this structure, light from the first light source unit and light from the second light source unit can be supplied to different surfaces of the wavelength conversion element and released through different surfaces of the wavelength conversion element.

It is preferable that a first surface as surface receiving light from the first light source unit and a second surface as surface receiving light from the second light source unit on the wavelength conversion element are inclined to the particular direction. In this structure, light emitted from the first light source unit and supplied to the first surface substantially in the vertical direction and light emitted from the second light source unit and supplied to the second surface substantially in the vertical direction can be directed in directions different from the particular direction in the wavelength conversion element.

It is preferable that an incident angle of light from the first light source unit with respect to the wavelength conversion element is set according to the wavelength of the light from the first light source unit, and that an incident angle of light from the second light source unit with respect to the wavelength conversion element is set according to the wavelength of the light from the second light source unit. In this structure, light having predetermined wavelength can be emitted after wavelength conversion.

It is preferable that a plurality of light source units supplying lights to a common surface of the wavelength conversion element are provided. In this structure, higher outputs can be obtained by disposing a larger number of light source units. Moreover, the light source device can effectively reduce speckle noise by emitting lights having different wavelengths using the plural light source units.

It is preferable that at least either a first resonating unit which reflects light emitted from the first light source unit and transmitted through the wavelength conversion element and resonates the light from the first light source unit in the space between the first light source unit and the first resonating unit, or a second resonating unit which reflects light emitted from the second light source unit and transmitted through the wavelength conversion element and resonates the light from the second light source unit in the space between the second light source unit and the second resonating unit is provided. In this structure, at least either light from the first light source unit after wavelength conversion by the wavelength conversion element or light from the second light source unit after wavelength conversion by the wavelength conversion element can be efficiently emitted.

It is preferable that at least either the first resonating unit or the second resonating unit is provided on the wavelength conversion element. In this structure, the light source device can be further made compact and manufactured at lower cost by combining at least either the first resonating unit or the second resonating unit with the wavelength conversion element.

It is preferable that at least either a first bending unit which bends optical path of light traveling from the wavelength conversion element toward the first light source unit after wavelength conversion by the wavelength conversion element, or a second bending unit which bends optical path of light traveling from the wavelength conversion element toward the second light source unit after wavelength conversion by the wavelength conversion element is provided. In this structure, at least either light from the first light source unit after wavelength conversion by the wavelength conversion element or light from the second light source unit after wavelength conversion by the wavelength conversion element can be further efficiently emitted.

It is preferable that an optical path conversion unit which converts traveling direction of either light from the first light source unit after wavelength conversion by the wavelength conversion element or light from the second light source unit after wavelength conversion by the wavelength conversion element is provided. In this structure, traveling directions of light from the first light source unit after wavelength conversion by the wavelength conversion element and light from the second light source unit after wavelength conversion by the wavelength conversion element can be equalized.

It is preferable that the first light source unit and the second light source unit supply light traveling substantially in parallel to the wavelength conversion element. In this structure, traveling directions of light from the first light source unit after wavelength conversion by the wavelength conversion element and light from the second light source unit after wavelength conversion by the wavelength conversion element can be equalized by simple structure without using the optical path conversion unit. Thus, the light source device can be made further compact and produced at lower cost.

A projector according to a second aspect of the invention includes the light source described above to display an image by using light emitted from the light source device. The projector can obtain high outputs by using the light source device described above. Thus, the projector can display bright images.

BRIEF DESCRIPTION OF THE DRAWINGS

The invention will be described with reference to the accompanying drawings, wherein like numbers reference like elements.

FIG. 6 shows examples of wavelengths λ1 and λ2 satisfying phase matching condition for an angle θ and the like.

DESCRIPTION OF EXEMPLARY EMBODIMENTS

Exemplary embodiments according to the invention are hereinafter described in detail with reference to the drawings.

First Embodiment

Figure 1:
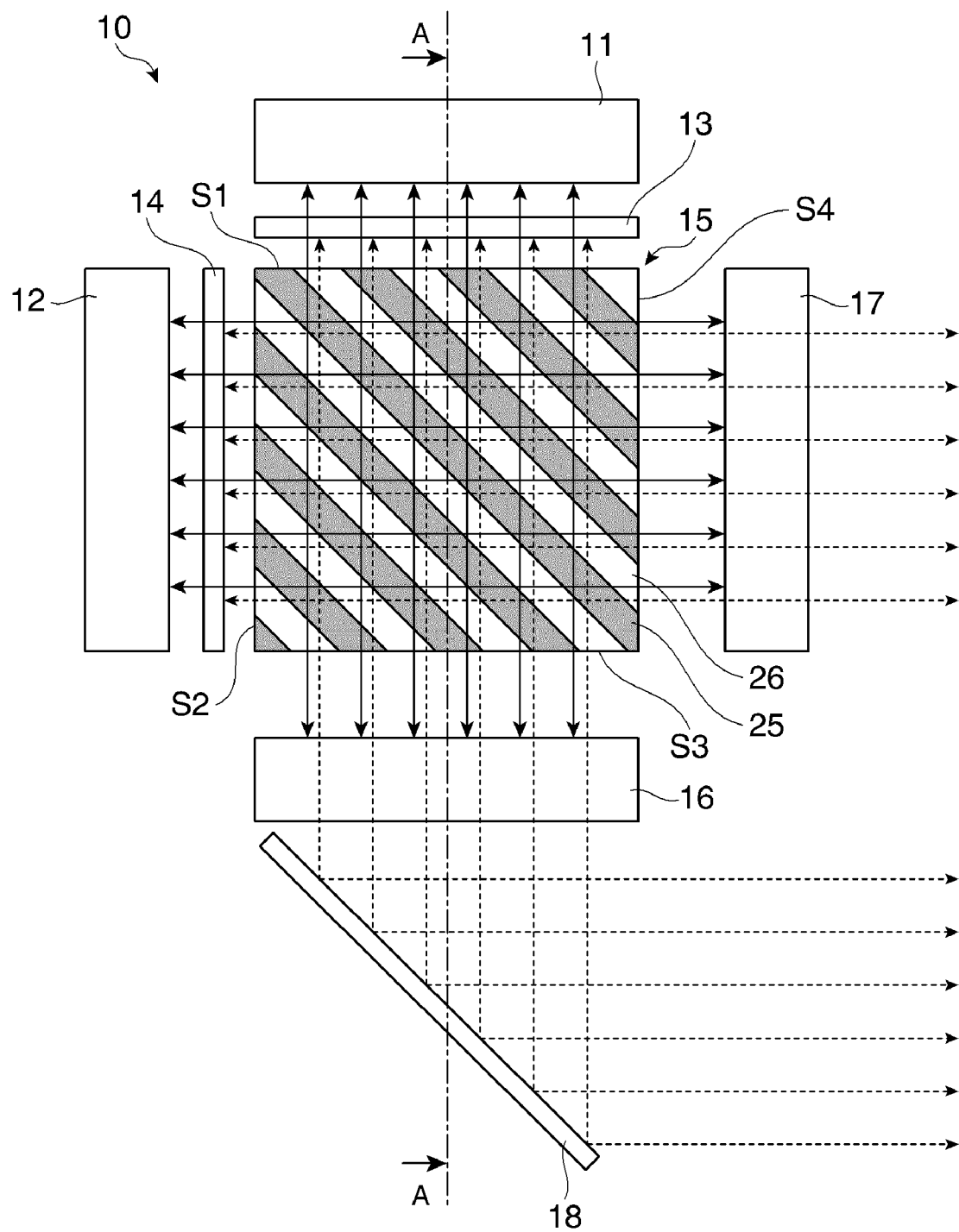
FIG. 1 is a cross-sectional view illustrating a general structure of a light source device according to a first embodiment of the invention.

FIG. 1 a cross-sectional view illustrating a general structure of a light source device 10 according to a first embodiment of the invention. The light source device 10 is a laser beam source for supplying laser beams. A first light source unit 11 and a second light source unit 12 are light source units for emitting fundamental lights having substantially equal wavelength. The fundamental light is infrared light, for example. The light source device 10 obtains higher outputs than that of a structure having a single light source unit by using the first light source unit 11 and the second light source unit 12.

Figure 2:
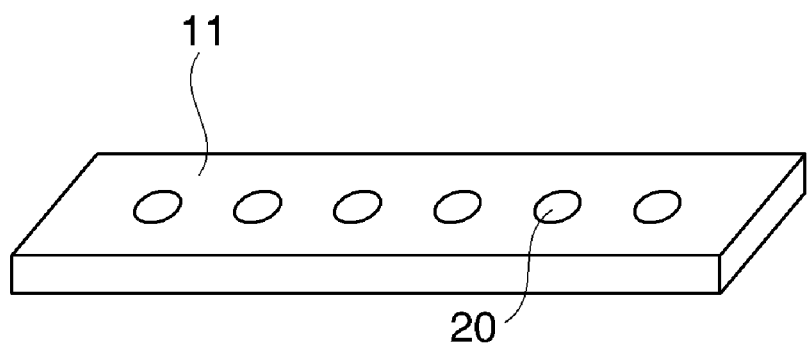
FIG. 2 is a perspective view illustrating a general structure of a first light source unit.

FIG. 2 is a perspective view illustrating a general structure of the first light source unit 11. The first light source unit 11 is a face emission type semiconductor element. The first light source unit 11 has six light emission units 20 arranged side by side in one line. The respective light emission units 20 emit fundamental lights.

Figure 3:
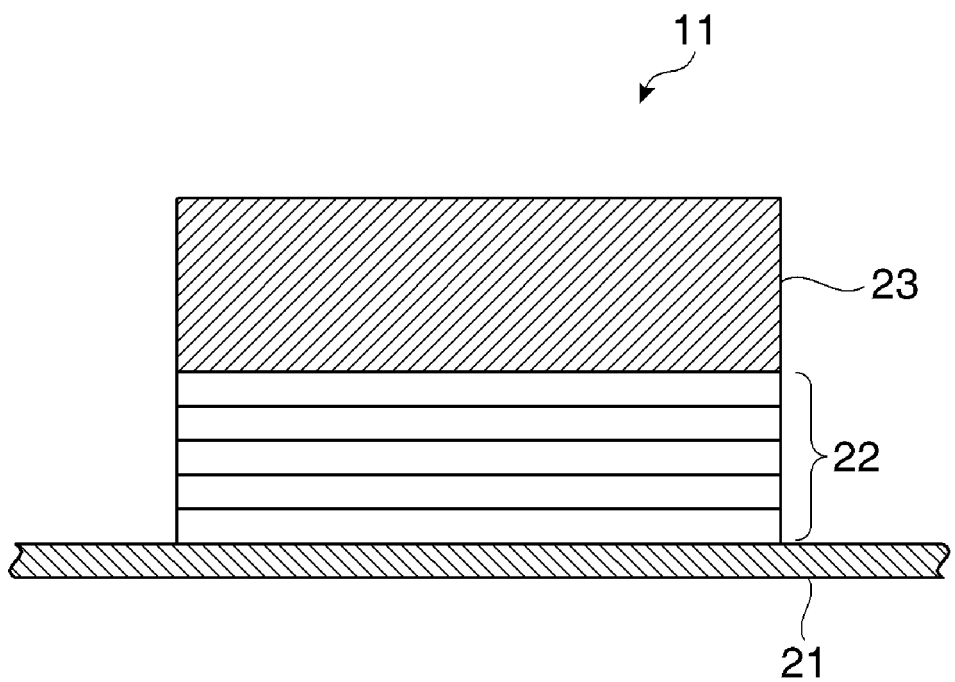
FIG. 3 is a cross-sectional view schematically illustrating the first light source unit.

FIG. 3 is a cross-sectional view schematically illustrating the structure of the first light source unit 11. A substrate 21 is constituted by semiconductor wafer, for example. A mirror layer 22 is disposed on the substrate 21. The mirror layer 22 is a lamination of layers constituted by derivatives having high refractive index and derivatives having low refractive index both produced by CVD (chemical vapor deposition), for example. The thickness, material, and number of layers constituting the mirror layer 22 are optimized for wavelength of fundamental lights emitted from the light emission units 20 to provide such a condition that reflection lights can interfere with one another and increase intensity.

An active layer 23 has laminated layers disposed on the surface of the mirror layer 22. The active layer 23 is connected with a not-shown power supply unit. When a predetermined amount of current is supplied to the active layer 23 from the power supply unit, the active layer 23 emits fundamental light. The first power source unit 11 supplies light from the emission surface of the active layer 23 in a direction substantially orthogonal to the mirror layer 22 and the substrate 21. The second power source unit 12 is a surface light emission type semiconductor element having a similar structure as that of the first power source unit 11. The cross section shown in FIG. 1 is a surface substantially parallel with chief rays of fundamental lights emitted from the first light source unit 11 and chief rays of fundamental lights emitted from the second light source unit 12.

Figure 4:
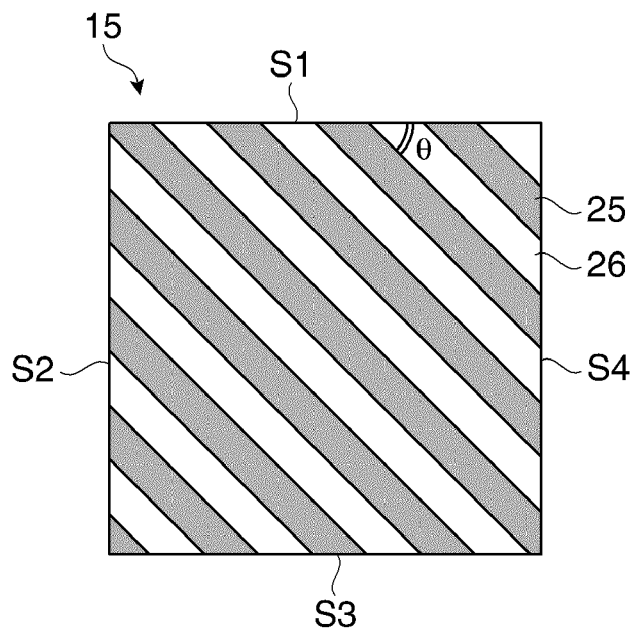
FIG. 4 is a plan view schematically illustrating an SHG element.

FIG. 4 schematically illustrates a structure of a second-harmonic generation (SHG) element in the plan view. The SHG element 15 converts wavelengths of fundamental lights emitted from the first light source unit 11 and from the second light source unit 12 to emit higher harmonic light. The SHG element 15 is a wavelength conversion element for converting wavelengths of lights emitted from the first light source unit 11 and the second light source unit 12. Higher harmonic light is visible light, for example. The wavelength of higher harmonic light is half of the wavelength of fundamental light.

The SHG element 15 has a substantially equilateral square pole shape (or rectangular parallelepiped shape) containing first surface S1, second surface S2, third surface S3, and fourth surface S4. The first surface S1 is positioned adjacent to the second surface S2 and the fourth surface S4 and opposed to the third surface S3. The second surface S2 is positioned adjacent to the first surface S1 and the third surface S3 and opposed to the fourth surface S4. In the plan view structure shown in the figure, the SHG element 15 has a square shape having four sides of the first surface S1, second surface S2, third surface S3, and fourth surface S4 defined by straight lines.

The SHG element 15 is constituted by non-linear optical crystal, for example. The non-linear optical crystal is periodically poled lithium niobate (PPLN) produced from lithium niobate ($LiNbO_3$). The SHG element 15 has first polarized layers 25 and second polarized layers 26 having inverted polarization directions. The first polarized layers 25 and the second polarized layers 26 are alternately disposed side by side in a particular direction. The first polarized layers 25 and the second polarized layers 26 have polarization inverted structures having inverted signs of non-linear optical constants for each coherent length.

The first polarized layers 25 are parts of optical crystal having inverted spontaneous polarization. The second polarized layers 26 are parts of optical crystal having spontaneous polarization without inversion. A particular direction for disposing the first polarized layers 25 and the second polarized layers 26 side by side corresponds to one of diagonal lines of a square shown in the figure. Each angle θ formed by the boundary surfaces of the first polarized layers 25 and the second polarized layers 26 is 45 degrees. The first surface S1 and the second surface S2 are inclined to the particular direction of the arrangement of the first polarized layers 25 and the second polarized layers 26 disposed side by side. The temperature of the SHG element 15 is controlled by a not-shown temperature control unit.

The polarization inverted structure is produced by applying voltage to non-linear optical crystals having spontaneous polarization in many cases. The polarization inverted structure is obtained by forming small patterns of insulation layer on lithium niobate substrate (LN substrate) and applying voltage thereto via metal film or electrolyte, for example. The surfaces S1 through S4 of the SHG element 15 are formed by cutting optical crystals having polarization inverted structure in an appropriate manner.

Returning to FIG. 1, the first light source unit 11 is disposed opposed to the first surface S1 via a first bending unit 13. The emission surface of the first light source unit 11 for emitting fundamental light is substantially parallel with the first surface S1. The second light source unit 12 is disposed opposed to the second surface S2 via a second bending unit 14. The emission surface of the second light source unit 12 for emitting fundamental light is substantially parallel with the second surface S2. A first VHG (volume holographic grating) 16 is disposed opposed to the third surface S3 of the SHG element 15. The reflection structure of the first VHG 16 is substantially parallel with the third surface S3. A second VHG 17 is disposed opposed to the fourth surface S4 of the SHG element 15. The second VHG 17 is substantially parallel with the fourth surface S4.

The first VHG 16 functions as a first resonating unit for resonating light emitted from the first light source unit 11 in the space between the first light source unit 11 and the first VHG 16. The first VHG 16 selectively reflects light having particular wavelength by diffraction. The first VHG 16 is a narrow-band reflection mirror which has reflection characteristics for providing half width of several nanometers around the wavelength of fundamental light. The first VHG 16 transmits light having a wide wavelength band including the wavelength of higher harmonic light in the visible range.

The first VHG 16 is formed from photo-refractive crystal such as $LiNbO_3$ and BGO, polymer or the like. The first VHG 16 records interference fringes produced by lights received in two directions. The interference fringes are recorded as periodic structures containing high refractive index parts and low refractive index parts arranged periodically. The first VHG 16 selectively reflects only light satisfying Bragg condition for the interference fringes by diffraction. The interference fringes function as reflection structures for reflecting light entering the first VHG 16.

The mirror layer 22 of the first light source unit 11 (see FIG. 3) and the first VHG 16 constitute a resonating structure for resonating light emitted from the first light source unit 11. The second VHG 17 functions as a second resonating unit for resonating light emitted from the second light source unit 12 in the space between the second light source unit 12 and the second VHG 17. The second VHG 17 has a structure similar to that of the first VHG 16. The mirror layer 22 of the second light source unit 12 and the second VHG 17 constitute a resonating structure for resonating light emitted from the second light source unit 12.

Figure 5:
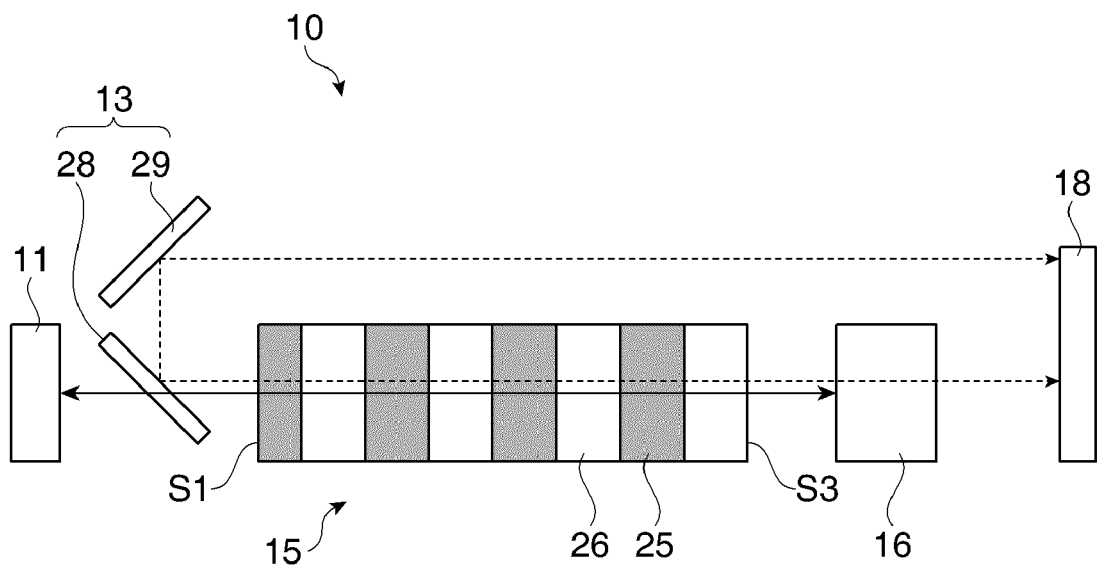
FIG. 5 is a cross-sectional view taken along a line A-A in FIG. 1.

FIG. 5 is a cross-sectional view of the structure taken along a line A-A in FIG. 1. In the figure, a solid line with arrow shows chief ray of fundamental light, and a broken line with arrow shows chief ray of higher harmonic light. The first bending unit 13 bends the optical path of light traveling from the SHG element 15 toward the first light source unit 11 after wavelength conversion by the SHG element 15. The first bending unit 13 has a wavelength separation mirror 28 and a reflection mirror 29.

The wavelength separation mirror 28 is provided on the optical path between the first light source unit 11 and the first surface S1. The wavelength separation mirror 28 is a wide band reflection mirror which transmits light in the wavelength band containing wavelength of fundamental light and reflects light in the wavelength range containing wavelength of higher harmonic light to separate fundamental light from higher harmonic light. The wavelength separation mirror 28 is produced by coating a transparent material as a parallel flat plate with wavelength selection film such as dielectric multilayer film. In the cross section shown in FIG. 5, the reflection surface of the wavelength separation mirror 28 is inclined substantially at 45 degrees to the chief ray of light emitted from the first light source unit 11.

The reflection mirror 29 is disposed at a position receiving higher harmonic light reflected by the wavelength separation mirror 28. The reflection mirror 29 reflects higher harmonic light released from the wavelength separation mirror 28. The reflection mirror 29 is produced by providing dielectric multilayer film or other reflection film on a transparent material having parallel flat plate shape. The reflection surface of the reflection mirror 29 is inclined at approximately 45 degrees to chief ray of light released from the wavelength separation mirror 28. The reflection surface of the reflection mirror 29 is substantially perpendicular to the reflection surface of the wavelength separation mirror 28. The reflection mirror 29 can be produced from material having high reflectivity such as material coated with metal film. The wavelength separation mirror 28 and the reflection mirror 29 may be combined as one piece by using a common holding member. The second bending unit 14 bends optical path of light traveling from the SHG element 15 toward the second light source unit 12 after wavelength conversion by the SHG element 15. The second bending unit 14 has a structure similar to that of the first bending unit 13.

An optical path conversion unit 18 is disposed at a position receiving higher harmonic light transmitted by the first VHG 16 and higher harmonic light reflected by the reflection mirror 29 of the first bending unit 13. The optical path conversion unit 18 converts the traveling direction of light emitted from the first light source unit 11 after wavelength conversion by the SHG element 15. The optical path conversion unit 18 is produced by providing dielectric multilayer film or other reflection film on a transparent material having parallel flat plate shape. The reflection surface of the optical conversion unit 18 is inclined at approximately 45 degrees to chief ray of light emitted from the first light source unit 11. The optical path conversion unit 18 can be produced from material having high reflectivity such as material coated with metal film.

The process of emitting laser beam from the light source device 10 is now described with reference to FIGS. 1 and 5. Fundamental light emitted from the respective light emission units 20 of the first light source unit 11 passes through the wavelength separation mirror 28 of the first bending unit 13 and enters the first surface S1 of the SHG element 15. The chief ray of the fundamental light entering the first surface S1 is substantially orthogonal to the first surface S1. Fundamental light emitted from the respective light emission units 20 of the second light source unit 12 passes through the wavelength separation mirror 28 of the second bending unit 14 and enters the second surface S2 of the SHG element 15. The chief ray of the fundamental light entering the second surface S2 is substantially orthogonal to the second surface S2. The first light source unit 11 and the second light source unit 12 supply light to the surfaces S1 and S2 adjacent to each other on the SHG element 15.

Light emitted from the first light source unit 11 and supplied to the SHG element 15 through the first surface S1 and light emitted from the second light source unit 12 and supplied to the SHG element 15 through the second surface S2 cross each other inside the SHG element 15. The chief ray of the light emitted from the first light source unit 11 and transmitted from the SHG element 15 is not parallel with the chief ray of the light emitted from the second light source unit 12 and transmitted by the SHG element 15. More specifically, the chief ray of the light from the first light source unit 11 is not parallel with the chief ray of the light from the second light source unit 12 inside the SHG element 15 (while passing through the SHG element 15). The chief ray of the light from the first light source unit 11 is inclined at approximately 45 degrees to the particular direction of the arrangement of the first polarized layers 25 and the second polarized layers 26 disposed side by side. The chief ray of the light from the second light source unit 12 is also inclined at approximately 45 degrees to the particular direction. The first light source unit 11 and the second light source unit 12 direct light in directions different from the particular direction in the SHG element 15. The pitch of the polarization inverted structures formed on the SHG element 15 is set in such a manner as to satisfy phase matching condition for the light from the first light source unit 11 and light from the second light source unit 12 both traveling in directions inclined at approximately 45 degrees to the particular direction.

The light having entered the SHG element 15 through the first surface S1 and the light having entered the SHG element 15 through the second surface S2 are released from the SHG element 15 through the different surfaces S3 and S4, respectively. The light having passed from the first surface S1 to the third surface S3 of the SHG element 15 enters the first VHG 16. The chief ray of the light entering the first VHG 16 is substantially perpendicular to the reflection structure of the first VHG 16. The higher harmonic light generated from the fundamental light having entered the SHG element 15 through the first surface S1 passes through the first VHG 16. The fundamental light having entered the first VHG 16 through the third surface S3 without wavelength conversion by the SHG element 15 is reflected by the first VHG 16. The fundamental light reflected by the first VHG 16 enters the third surface S3 of the SHG element 15. The light having passed from the third surface S3 to the first surface S1 of the SHG element 15 enters the wavelength separation mirror 28 of the first bending unit 13.

The fundamental light having entered the wavelength separation mirror 28 from the first surface S1 without wavelength conversion by the SHG element 15 passes through the wavelength separation mirror 28 and enters the first light source unit 11. The fundamental light having entered the first light source unit 11 is reflected by the mirror layer 22 (see FIG. 3) and travels toward the wavelength separation mirror 28. The active layer 23 (see FIG. 3) amplifies the fundamental light by resonating the fundamental light between the mirror layer 22 and the first VHG 16. The fundamental light reflected by the mirror layer 22 and the first VHG 16 is resonated with fundamental light emitted next from the active layer 23 for amplification.

Higher harmonic light generated from fundamental light supplied to the SHG element 15 through the third surface S3 is bended at approximately 90 degrees by reflection on the wavelength separation mirror 28. The higher harmonic light reflected by the wavelength separation mirror 28 is further bended at approximately 90 degrees by reflection on the reflection mirror 29. Thus, the optical path of the higher harmonic light traveling from the SHG element 15 to the wavelength separation mirror 28 is bended at approximately 180 degrees by reflections on the wavelength separation mirror 28 and the reflection mirror 29 of the first bending unit 13. The higher harmonic light bended by the first bending unit 13 travels in the same direction as that of the higher harmonic light transmitted by the first VHG 16. The higher harmonic light transmitted by the first VHG 16 and the higher harmonic light bended by the first bending unit 13 are bended at approximately 90 degrees by reflection of the optical conversion unit 18. The higher harmonic light bended by the optical path conversion unit 18 is released to the outside of the light source device 10.

The light having passed from the second surface S2 to the fourth surface S4 enters the second VHG 17. The chief ray of the light entering the second VHG 17 is substantially perpendicular to the reflection structure of the second VHG 17. The higher harmonic light generated from the fundamental light supplied to the SHG element 15 through the second surface S2 passes through the second VHG 17. The fundamental light entering the second VHG 17 from the fourth surface S4 without wavelength conversion by the SHG element 15 is reflected by the second VHG 17. The fundamental light reflected by the second VHG 17 enters the fourth surface S4 of the SHG element 15. The light having passed from the fourth surface S4 to the second surface S2 of the SHG element 15 enters the wavelength separation mirror 28 of the second bending unit 14.

The fundamental light supplied to the wavelength separation mirror 28 from the second surface S2 without wavelength conversion by the SHG element 15 passes through the wavelength separation mirror 28 and enters the second light source unit 12. The fundamental light having entered the second light source unit 12 is reflected by the mirror layer 22 toward the wavelength separation mirror 28. The fundamental light from the second light source unit 12 resonates between the mirror layer 22 and the second VHG 17 similarly to the fundamental light from the first light source unit 11.

The higher harmonic light generated from the fundamental light having entered the SHG element 15 through the fourth surface S4 is bended by the second bending unit 14 and travels in the same direction as that of the higher harmonic light transmitted by the second VHG 17. The higher harmonic light transmitted by the second VHG 17 and the higher harmonic light bended by the second bending unit 14 travel in the same direction as that of the higher harmonic light bended by the optical path conversion unit 18 to the outside of the light source device 10.

By converting the wavelength of the light emitted from the first light source unit 11 and the light emitted from the second light source unit 12 by using the common SHG element 15, the light source device 10 can be made compact compared with the structure using wavelength conversion elements provided for each light source unit, and the manufacturing cost can be reduced. Thus, high outputs can be obtained by the compact light source device 1 manufactured at low cost.

The structure of the first light source unit 11 and the second light source unit 12 is not limited to that containing the six light emission units 20 arranged side by side in one line. The first light source unit 11 and the second light source unit 12 may have any structure as long as it has one or a plurality of the light emission units 20. The plural light emission units 20 are not required to be disposed side by side in one line, but may be arranged in a two-dimensional direction. The first light source unit 11 and the second light source unit 12 are not required to resonate light by using the first resonating unit and the second resonating unit provided outside the first light source unit 11 and the second light source unit 12, but may resonate light inside the first light source unit 11 and the second light source unit 12 to emit laser beams. The first resonating unit and the second resonating unit disposed outside the first light source unit 11 and the second light source unit 12 may be removed from the light source unit 10.

The optical path conversion unit 18 may convert the traveling direction of either the light from the first light source unit 11 after wavelength conversion by the SHG element 15 or the light from the second light source unit 12 after wavelength conversion by the SHG element 15. The optical path conversion unit 18 may be removed from the light source device 10. In this case, the traveling directions of the light from the first light source unit 11 after wavelength conversion by the SHG element 15 and the light from the second light source unit 12 after wavelength conversion by the SHG element 15 form an angle of approximately 90 degrees when released. The projector or the like including the light source device 10 may convert the traveling direction of laser beams from the light source device 10 by using optical elements in an appropriate manner. The light source device 10 may have any structure as long as it can emit the light from the first light source unit 11 after wavelength conversion by the SHG element 15 and the light from the second light source unit 12 after wavelength conversion by the SHG element 15. Thus, the first bending unit 13 and the second bending unit 14 may be removed. The light source device 10 may include optical element such as polarized light selection filter and wavelength selection filter as necessary.

The first light source unit 11 and the second light source unit 12 are not required to emit fundamental lights having substantially equivalent wavelengths, but may emit fundamental lights having different wavelengths. When fundamental lights having different wavelengths are generated from the first light source unit 11 and the second light source unit 12, the angle $\theta$ of the SHG element 15 are set at an appropriate value according to a wavelength $\lambda 1$ of fundamental light emitted from the first light source unit 11 and a wavelength $\lambda 2$ of fundamental light emitted from the second light source unit 12. When the angle $\theta$ is an angle other than 45 degrees, the particular direction of the arrangement of the first polarized layers 25 and the second polarized layers 26 disposed side by side is a direction different from the diagonal direction of the square.

Figure 6:
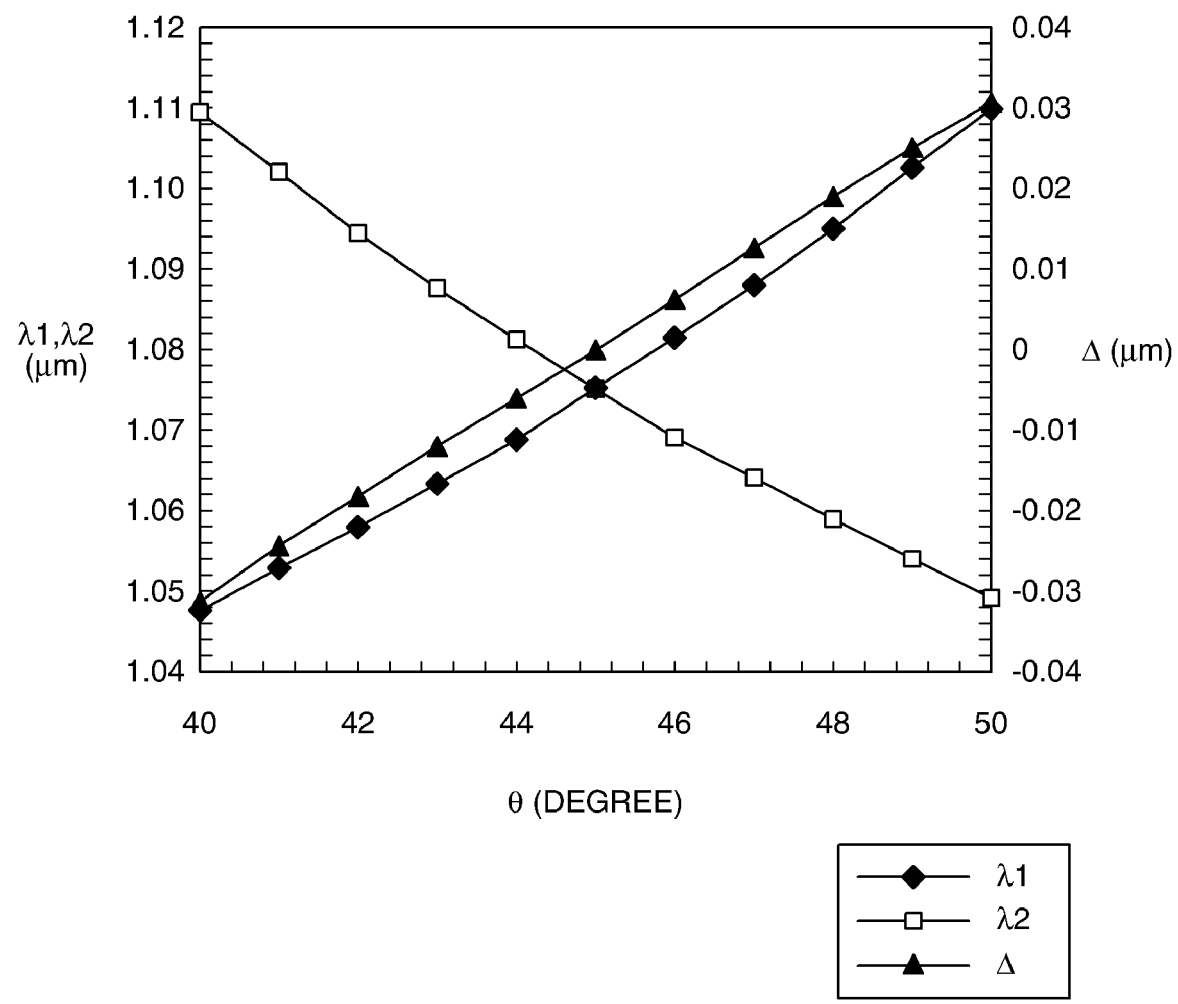

FIG. 6 shows examples of the wavelengths $\lambda 1$ and $\lambda 2$ satisfying phase matching condition for the angle $\theta$ and wavelength difference $\Delta$ of higher harmonic light emitted from the light source device 10. The wavelength difference $\Delta$ becomes negative value when the wavelength of higher harmonic light generated from fundamental light from the second light source unit 12 is larger than the wavelength of harmonic light generated from fundamental light from the first light source unit 11, and becomes positive value when the wavelength of higher harmonic light generated from fundamental light from the second light source unit 12 is smaller than the wavelength of harmonic light generated from fundamental light from the first light source unit 11 ($\Delta=(\lambda 1-\lambda 2)/2$). The pitch of the polarization inverted structures of the SHG element 15 is a certain fixed period. The temperature of the SHG element 15 is a certain fixed temperature such as 90 degrees.

When the angle $\theta$ is 45 degrees, the wavelengths $\lambda 1$ and $\lambda 2$ agree with each other. For example, each of the wavelengths $\lambda 1$ and $\lambda 2$ is about 1.075 μm. In this case, the wavelength difference $\Delta$ is zero. When the angle $\theta$ is larger than 45 degrees, the wavelength $\lambda 1$ becomes larger than that when the angle $\theta$ is 45 degrees. In this case, the wavelength $\lambda 2$ becomes smaller than that when the angle $\theta$ is 45 degrees. For example, when the angle $\theta$ is 46 degrees, the wavelength $\lambda 1$ and the wavelength λ2 are about 1.081 μm and about 1.069 μm, respectively. Thus, the wavelength difference Δ is 0.006 μm. When the angle θ is smaller than 45 degrees, the wavelength λ1 becomes smaller than that when the angle θ is 45 degrees. In this case, the wavelength λ2 becomes larger than that when the angle θ is 45 degrees. For example, when the angle θ is 44 degrees, the wavelength λ1 and the wavelength λ2 are about 1.069 μm and about 1.081 μm, respectively. Thus, the wavelength difference Δ is −0.006 μm.

When laser beam as coherent light is applied to a diffusion surface such as screen, there is a possibility that interference patterns called speckle patterns containing light points and dark points randomly distributed are produced. The speckle patterns are generated by random interference between lights diffused at respective points on the diffusion surface. The speckle patterns recognized during display of images impose adverse effects on image observation by giving glaring flickers to the observer.

It is known that a light source device emitting laser beam can reduce speckle noise by combining plural laser beams having certain wavelength differences. When speckle contrast is used as index for showing the degree of speckle noise, the speckle contrast can be reduced to about 60% by combining laser beams having wavelength difference of about 0.002 μm, for example. The speckle contrast is index showing difference in brightness and darkness produced by speckle patterns, assuming that the speckle contrast becomes 100% when the difference in brightness and darkness produced by interference of coherent light becomes the maximum.

The light source device 10 in this embodiment combines lights having different wavelengths and emits the combined light by converting wavelengths of light from the first light source unit 11 and light from the second light source unit 12 having different wavelengths. Thus, speckle noise can be reduced by combining plural laser beams having appropriate wavelength differences and emitting the combined laser beams. Moreover, speckle noise can be reduced by the light source device 10 more than a structure emitting laser beams using light from the single light emission unit 20 by using the plural light emission units 20 for laser beam emission. The SHG element 15 having the desired angle θ can be produced by appropriately controlling inclination of the cut surface for the polarization inverted structure at the time of cutting the optical crystal having the polarization inverted structure in the manufacturing step of the SHG element 15.

The angle θ of the light source device 10 is not limited to an angle in the range from 40 to 50 degrees shown in FIG. 6, but may be an angle smaller than 40 degrees or larger than 50 degrees. Wavelength of laser beam emitted from the light source device 10 may be adjusted to any value by appropriately determining the angle θ according to the wavelengths λ1 and λ2. Lights emitted from the light source device 10 may have different colors by using lights from the first light source unit 11 and from the second light source unit 12. For example, red light having wavelength of about 0.65 μm and blue light having wavelength of about 0.45 μm may be emitted from the light source device 10 by setting the wavelength λ1 at about 1.3 μm and the wavelength λ2 at about 0.9 μm. Thus, the light source device 10 can emit plural color lights by using the common SHG element 15. The first light source unit 11 and the second light source unit 12 are not required to supply light to adjoining surfaces of the SHG element 15, but may supply light to any surfaces of the SHG element 15 as long as they are different surfaces. The shape of the SHG element 15 is not limited to square, but may be appropriately varied.

Figure 7:
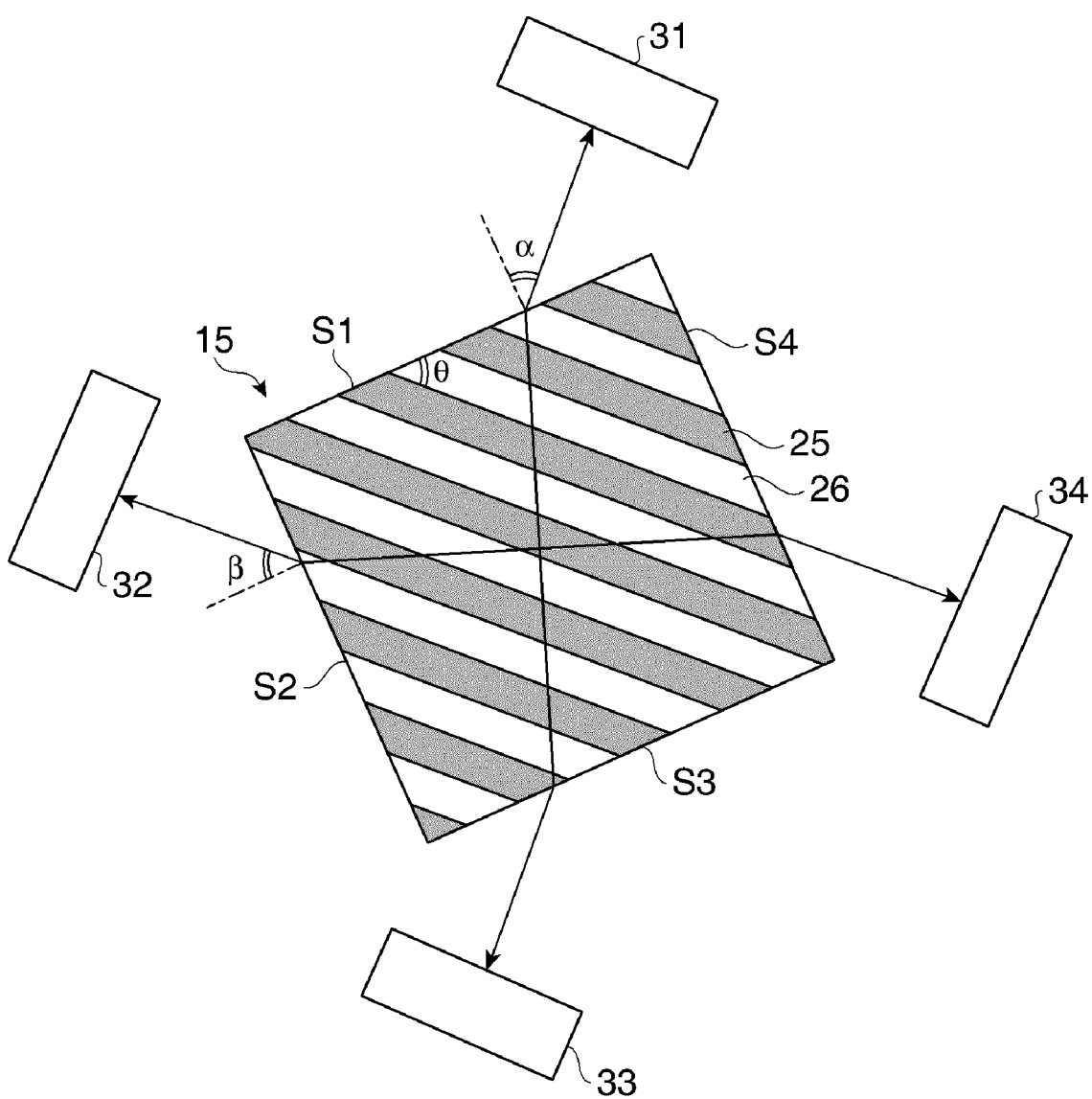
FIG. 7 illustrates a characteristic part of a light source device according to a modified example 1 of the first embodiment.

FIG. 7 shows a characteristic part of a light source device according to a modified example 1 of this embodiment. The light source device in this modified example is characterized by supplying fundamental light traveling diagonally toward the first surface S1 and the second surface S2 of the SHG element 15. Each of a first light source unit 31 and a second light source unit 32 has one or a plurality of the light emission units 20. The emission surface for emitting light on the first light source unit 31 is inclined to the first surface S1. The emission surface for emitting fundamental light on the second light source unit 32 is inclined to the second surface S2.

A first VHG 33 functions as a first resonating unit for resonating light from the first light source unit 31 in the space between the first light source unit 31 and the first VHG 33. The reflection structure of the first VHG 33 is inclined to the third surface S3 and substantially parallel with the emission surface of the first light source unit 31. A second VHG 34 functions as a second resonating unit for resonating light from the second light source unit 32 in the space between the second light source unit 32 and the second VHG 34. The reflection structure of the second VHG 34 is inclined to the fourth surface S4 and substantially parallel with the emission surface emitting fundamental light on the second light source unit 32.

Light emitted from the first light source unit 31 enters the first surface S1 at a predetermined incident angle α. The incident angle α is an angle formed by chief ray of light emitted from the first light source unit 31 and the vertical line of the first surface S1. Light having entered the SHG element 15 from the first surface S1 and passed the SHG element 15 is refracted by the first surface S1 and the third surface S3. In the SHG element 15, the light from the first light source unit 31 travels in a direction having certain inclination to the particular direction of the arrangement of the first polarized layers 25 and the second polarized layers 26 disposed side by side. The incident angle α is set at such a value as to satisfy phase matching condition for light traveling from the first light source unit 31 with predetermined inclination to the particular direction. Thus, the incident angle α of the light from the first light source unit 31 with respect to the SHG element 15 is set according to the wavelength λ1 of the light from the first light source unit 31.

Light emitted from the second light source unit 32 enters the second surface S2 at a predetermined incident angle β. The incident angle β is an angle formed by chief ray of light emitted from the second light source unit 32 and the vertical line of the second surface S2. Light having entered the SHG element 15 from the second surface S2 and passed the SHG element 15 is refracted by the second surface S2 and the fourth surface S4. In the SHG element 15, the light from the second light source unit 32 travels in a direction having certain inclination to the particular direction of the arrangement of the first polarized layers 25 and the second polarized layers 26 disposed side by side. The incident angle β is set at such a value as to satisfy phase matching condition for light traveling from the second light source unit 32 with predetermined inclination to the particular direction. Thus, the incident angle β of the light from the second light source unit 32 with respect to the SHG element 15 is set according to the wavelength λ2 of the light from the second light source unit 32.

The light source device in this modified example has a structure capable of emitting lights having the predetermined wavelengths λ1 and λ2 after wavelength conversion using the SHG element 15 which has the polarization inverted structure with the predetermined angle θ by controlling inclination of light entering the SHG element 15 in an appropriate manner. FIG. 6 is a graph showing relationships when both the angles α and β are 90 degrees.

Figure 8:
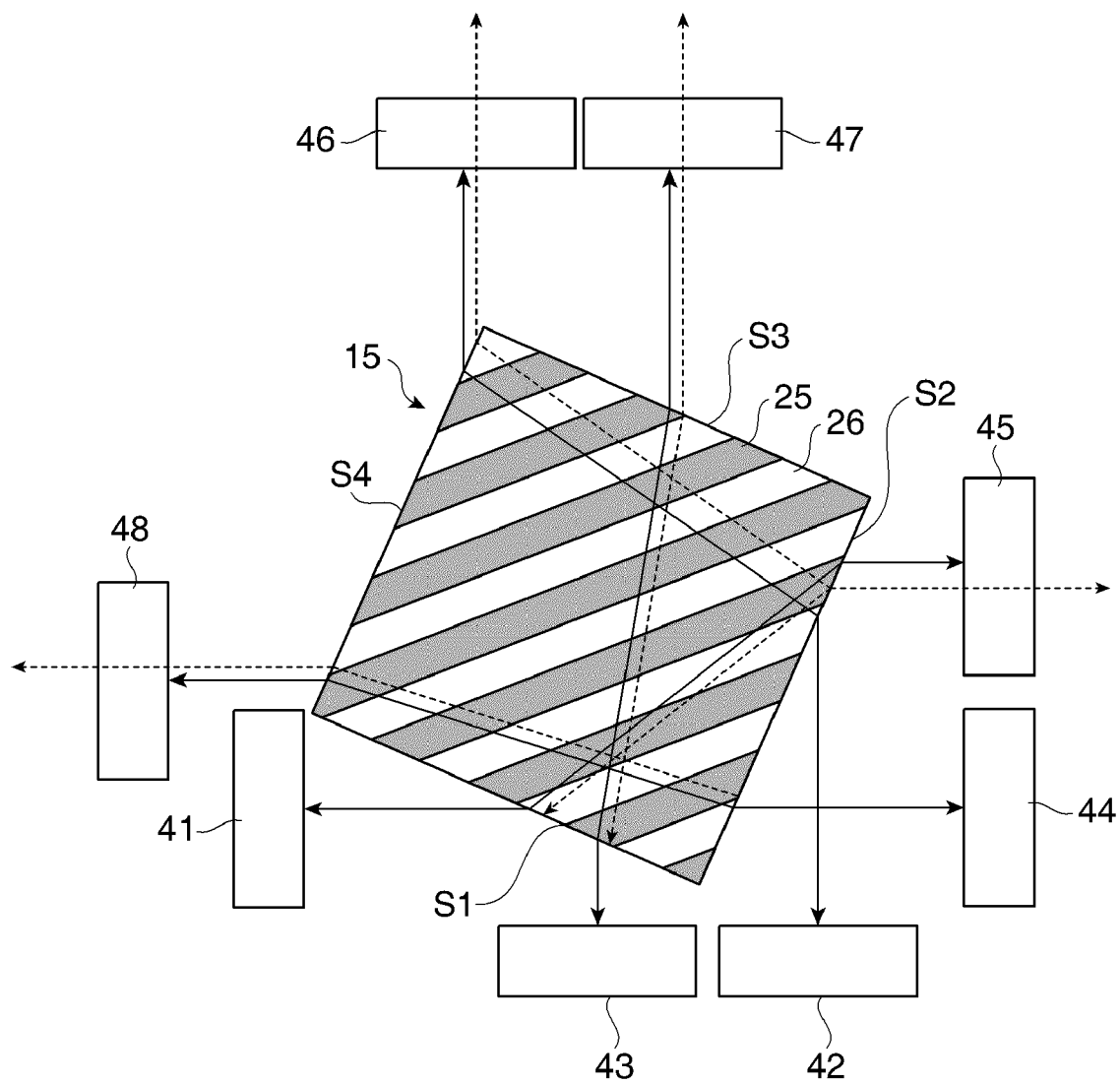
FIG. 8 illustrates a characteristic part of a light source device according to a modified example 2 of the first embodiment.

FIG. 8 shows a characteristic part of a light source device according to a modified example 2 of this embodiment. The light source device in this modified example is characterized by including a plurality of light source units for supplying lights to a common surface of the SHG element 15. Each of a first light source unit 41, a second light source unit 42, a third light source unit 43, and a fourth light source unit 44 has one or a plurality of the light emission units 20. The first light source unit 41 and the third light source unit 43 supply lights to the first surface S1 as the common surface of the SHG element 15. The emission surface of the first light source unit 41 and the emission surface of the third light source unit 43 are not parallel but substantially perpendicular to each other, for example. The second light source unit 42 and the fourth light source unit 44 supply lights to the second surface S2 as the common surface of the SHG element 15. The emission surface of the second light source unit 42 and the emission surface of the fourth light source unit 44 are not parallel but substantially perpendicular to each other, for example.

A first VHG 45 functions as the first resonating unit for resonating light from the first light source unit 41 in the space between the first light source unit 41 and the first VHG 45. A second VHG 46 functions as the second resonating unit for resonating light from the second light source unit 42 in the space between the second light source unit 42 and the second VHG 46. A third VHG 47 resonates light from the third light source unit 43 in the space between the third light source unit 43 and the third VHG 47. A fourth VHG 48 resonates light from the fourth light source unit 44 in the space between the fourth light source unit 44 and the fourth VHG 48.

Light emitted from the first light source unit 41 enters the SHG element 15 through the first surface S1. The light having passed the SHG element 15 from the first light source unit 41 is released through the second surface S2 of the SHG element 15 and supplied to the first VHG 45. Light emitted from the second light source unit 42 enters the SHG element 15 through the second surface S2. The light having passed the SHG element 15 from the second light source unit 42 is released through the fourth surface S4 of the SHG element 15 and supplied to the second VHG 46. Light emitted from the third light source unit 43 enters the SHG element 15 through the first surface S1. The light having passed the SHG element 15 from the third light source unit 43 is released through the third surface S3 of the SHG element 15 and supplied to the third VHG 47. Light emitted from the fourth light source unit 44 enters the SHG element 15 through the second surface S2. The light having passed the SHG element 15 from the fourth light source unit 44 is released through the fourth surface S4 of the SHG element 15 and supplied to the fourth VHG 48.

Each incident angle of lights emitted from the light source units 41, 42, 43, and 44 with respect to the SHG element 15 is set according to the wavelengths of lights from the light source units 41, 42, 43, and 44. The light source device according to this modified example which supplies lights to the common surfaces of the SHG element 15 from the plural light source units contains a number of light source units and thus obtains high outputs. Moreover, the light source device can effectively reduce speckle noise by emitting lights having different wavelengths from the plural light source units. The light source device in this modified example may be modified in an appropriate manner as long as lights from the plural light source units can be supplied to the common surface of the SHG element 15. For example, the number of the light source units for supplying light to the common surface of the SHG element 15 is not limited to two but may be three or more.

Second Embodiment

Figure 9:
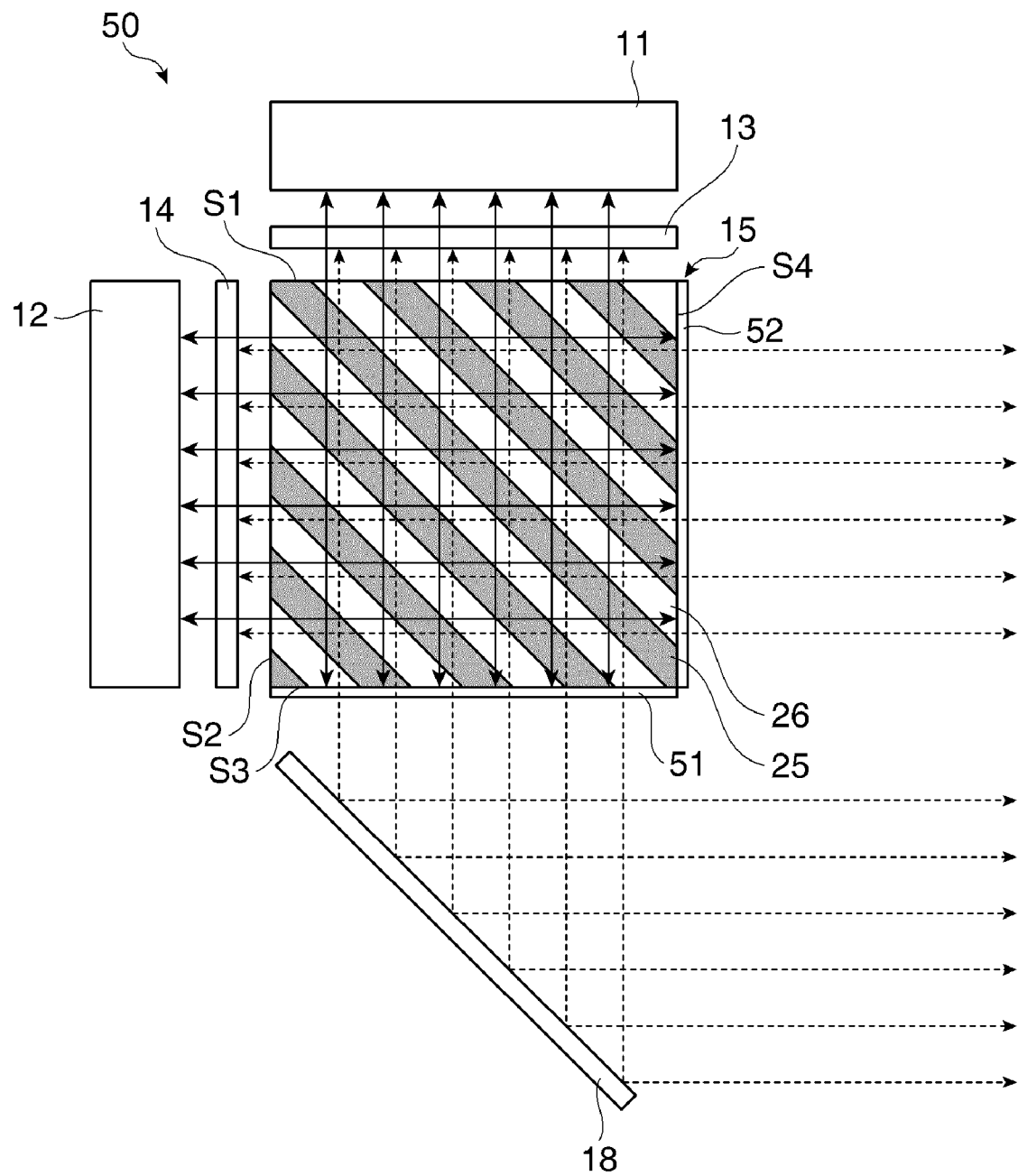
FIG. 9 is a cross-sectional view illustrating a general structure of a light source device according to a second embodiment of the invention.

FIG. 9 is a cross-sectional view illustrating a general structure of a light source device 50 according to a second embodiment of the invention. The light source device 50 in this embodiment is characterized by including a first wavelength selection film 51 provided in place of the first VHG 16, and a second wavelength selection film 52 provided in place of the second VHG 17. Similar reference numbers are given to parts similar to those in the first embodiment, and the same explanation is not repeated herein. The first wavelength selection film 51 is disposed on the third surface S3 of the SHG element 15. The first wavelength selection film 51 functions as the first resonating unit for resonating light from the first light source unit 11 in the space between the first light source unit 11 and the first wavelength selection film 51. The second wavelength selection film 52 is disposed on the fourth surface S4 of the SHG element 15. The second wavelength selection film 52 functions as the second resonating unit for resonating light from the second source unit 12 in the space between the second light source unit 12 and the second wavelength selection film 52.

The first wavelength selection film 51 and the second wavelength selection film 52 are narrow-band reflection films which reflect light having narrow wavelength band around wavelength of fundamental light with high reflectance. The first wavelength selection film 51 and the second wavelength reflection film 52 transmit light having wide wavelength band including wavelength of higher harmonic light in the visible range. Each of the first wavelength selection film 51 and the second wavelength selection film 52 is constituted by dielectric multilayer film, for example. The size of the light source device 50 can be further decreased by combining the first wavelength selection film 51 and the second wavelength selection film 52 with the SHG element 15 as one piece, and thus the manufacturing cost can be reduced. The light source device 50 may have any structure as long as at least either the first resonating unit or the second resonating unit is disposed on the wavelength conversion element.

Third Embodiment

Figure 10:
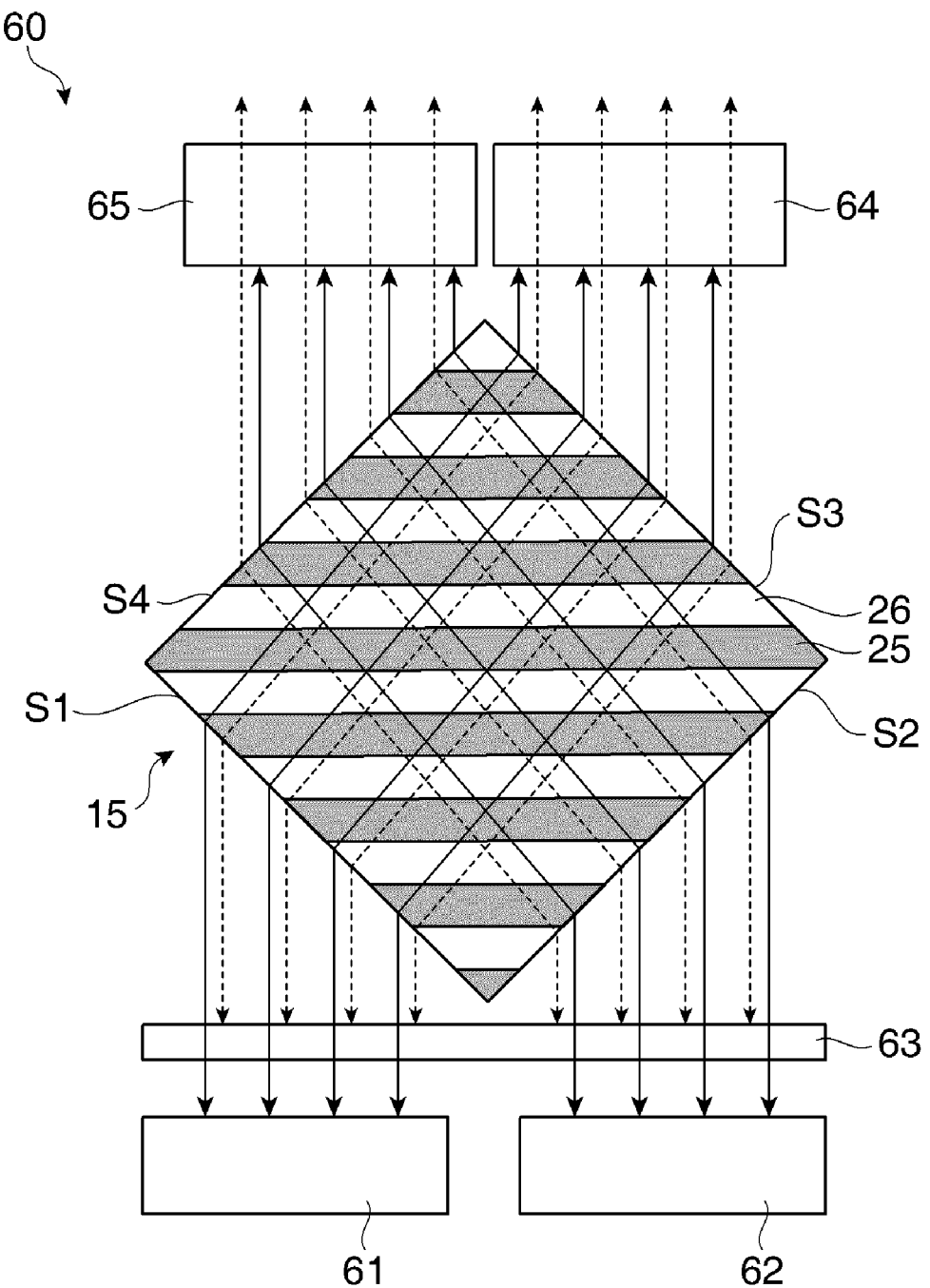
FIG. 10 is a cross-sectional view illustrating a general structure of a light source device according to a third embodiment of the invention.

FIG. 10 is a cross-sectional view illustrating a general structure of a light source device 60 according to a third embodiment of the invention. The light source device 60 in this embodiment is characterized in that lights are supplied from a first light source unit 61 and a second light source unit 62 disposed in parallel to the adjoining surfaces S1 and S2 of the SHG element 15. Similar reference numbers are given to parts similar to those in the first and second embodiments, and the same explanation is not repeated. The first light source unit 61 and the second light source unit 62 emit fundamental lights having substantially equal wavelengths or different wavelengths. Each of the first light source unit 61 and the second light source unit 62 has a plurality of light emission units. The first light source unit 61 and the second light source unit 62 are disposed in parallel such that chief rays of lights emitted from the first and second light sources 61 and 62 travel in parallel with each other. The first light source unit 61 and the second light source unit 62 supply lights traveling substantially in parallel to the SHG element 15.

A bending unit 63 has a structure similar to those of the first bending unit 13 and the second bending unit 14. The bending unit 63 bends the optical path of light traveling from the SHG element 15 to the first light source unit 61 and the second light source unit 62 after wavelength conversion by the SHG element 15. The first surface S1 of the SHG element 15 is inclined to the emission surface for emitting fundamental light on the first light source unit 61. The second surface S2 of the SHG element 15 is inclined to the emission surface for emitting fundamental light on the second light source unit 62.

A first VHG 64 functions as the first resonating unit for resonating light from the first light source unit 61 in the space between the first light source unit 61 and the first VHG 64. The reflection structure of the first VHG 64 is inclined to the third surface S3 and substantially parallel with the emission surface of the first light source unit 61. A second VHG 65 functions as the second resonating unit for resonating light from the second light source unit 62 in the space between the second light source unit 62 and the second VHG 65. The reflection structure of the second VHG 65 is inclined to the fourth surface S4 and substantially parallel with the emission surface of the second light source unit 62. The inclination of light from the first light source unit 61 with respect to the SHG element 15 and the inclination of light from the second light source unit 62 with respect to the SHG element 15 can be controlled by appropriately controlling the inclination of the SHG element 15 on the plane shown in the figure. The incident angle of light from the first light source unit 61 with respect to the SHG element 15 is set according to the wavelength $\lambda 1$ of light from the first light source unit 61. The incident angle of light from the second light source unit 62 with respect to the SHG element 15 is set according to the wavelength $\lambda 2$ of light from the second light source unit 62.

The light source device 60 in this embodiment supplies lights from the first light source unit 61 and the second light source unit 62 such that the lights can travel substantially in parallel. Thus, the traveling directions of the light from the first light source unit 61 and the light from the second light source unit 62 after wavelength conversion by the SHG element 15 can be equalized by a simple structure without using optical path conversion unit. Accordingly, the light source device 60 can be made further compact and manufactured at lower cost. When the lights from the first light source device 61 and from the second light source device 62 have the same wavelength, a common resonating unit can be used in place of the first resonating unit and the second resonating unit.

Fourth Embodiment

Figure 11:
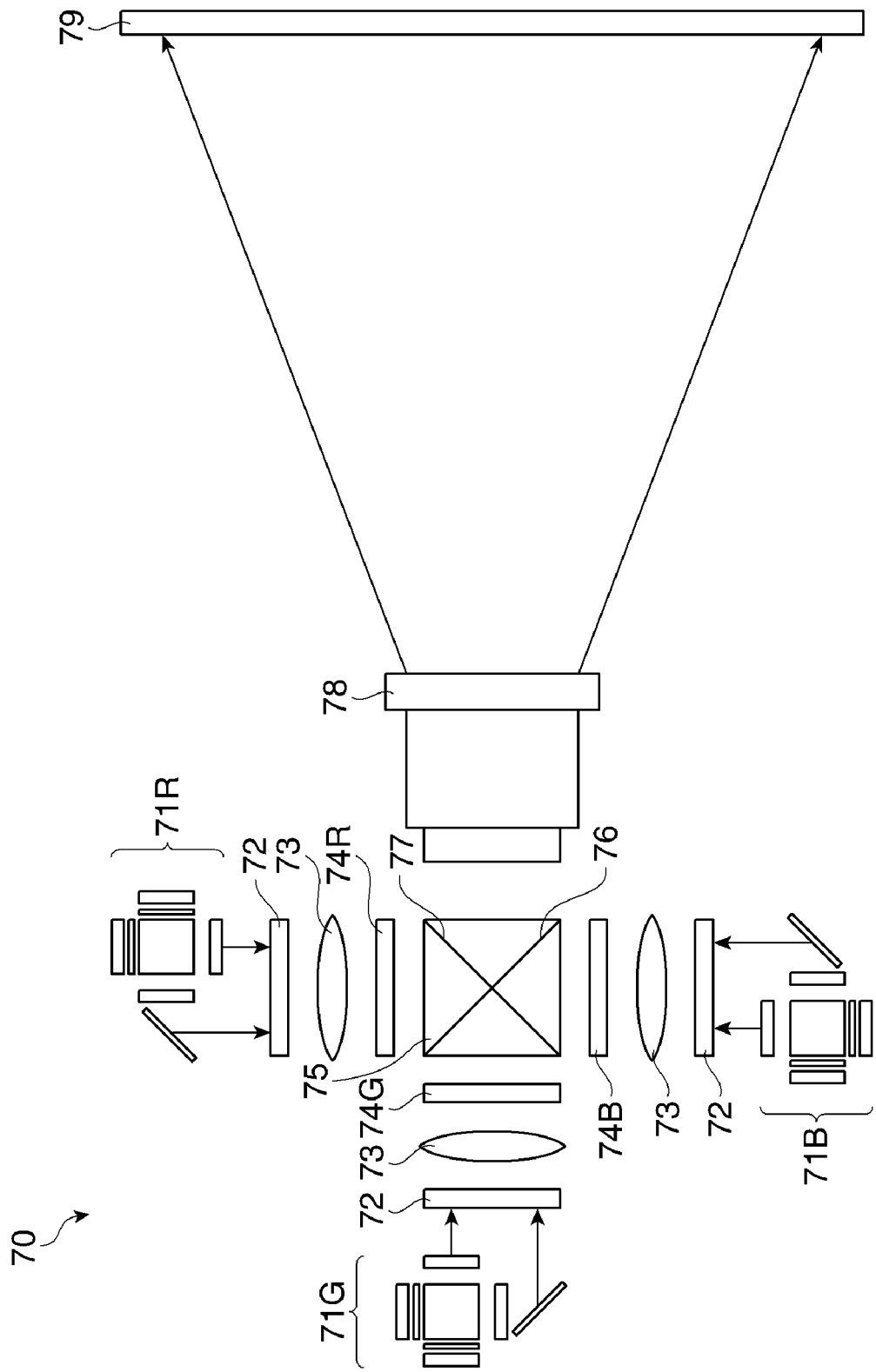
FIG. 11 is a cross-sectional view illustrating a general structure of a projector according to a fourth embodiment of the invention.

FIG. 11 illustrates a general structure of a projector 70 according to a fourth embodiment of the invention. The projector 70 is a front projection type projector which projects light to a screen 79 and produces images to be viewed by using light reflected by the screen 79. The projector 70 includes a red (R) light source device 71R, a green (G) light source device 71G, and a blue (B) light source device 71B. Each of the light source devices 71R, 71G, and 71B has a structure similar to that of the light source device 10 in the first embodiment (see FIG. 1). The projector 70 displays images by using lights emitted from the respective light source devices 71R, 71G, and 71B.

The R light source device 71R is a light source device for emitting R light. A diffusion element 72 shapes and enlarges an illumination area and equalizes light amount distribution of the illumination area. The diffusion element 72 is constituted by computer generated hologram (CGH) as a diffraction optical element, for example. A field lens 73 collimates light emitted from the R light source 71R and supplies the collimated light to an R special light modulation device 74R. The R spatial light modulation device 74R is a spatial light modulation device for modulating R light according to image signals, and is constituted by a transmission type liquid crystal display device. The R light modulated by the R spatial light modulation device 74R enters a cross dichroic prism 75 as a color combining system.

The G light source device 71G is a light source device for emitting G light. Light having passed through the diffusion element 72 and the field lens 73 enters a G spatial light modulation device 74G. The G spatial light modulation device 74G is a spatial light modulation device for modulating G light according to image signals, and is constituted by a transmission type liquid crystal display device. The G light modulated by the G spatial light modulation device 74G enters the cross dichroic prism 75 through a surface different from the surface receiving the R light.

The B light source device 71B is a light source device for emitting B light. Light having passed through the diffusion element 72 and the field lens 73 enters a B spatial light modulation device 74B. The B spatial light modulation device 74B is a spatial light modulation device for modulating B according to image signals, and is constituted by a transmission type liquid crystal display device. The B light modulated by the B spatial light modulation device 74B enters the cross dichroic prism 75 through a surface different from the surface receiving the R light and the surface receiving G light. The transmission type liquid crystal display device is a high temperature polysilicon (HTPS) TFT liquid crystal panel, for example.

The cross dichroic prism 75 has two dichroic films 76 and 77 crossing each other at approximately right angles. The first dichroic film 76 reflects R light and transmits G light and B light. The second dichroic film 77 reflects B light and transmits R light and G light. The cross dichroic prism 75 combines R light, G light, and B light entering in different directions, and releases the combined light toward the projection lens 78. The projection lens 78 projects the light combined by the cross dichroic prism 75 to the screen 79.

The projector 70 can display bright images by using the respective light sources 71R, 71G, and 71B having similar structure as that of the light source device 10. Moreover, the projector 70 can provide high-quality images having reduced speckle noise by emitting light having wide wavelength band from the light source devices 71R, 71G, and 71B. Each of the light source devices 71R, 71G, and 71B may have structure of any of the light source devices described in the above examples. The projector 70 may display images using plural color lights emitted from a common light source device. According to the projector 70, at least one of the light source devices 71R, 71G, and 71B is required to have a structure similar to that of the light source device in the embodiments. For example, the R light source device 71R may emit light without converting wavelength of light emitted from a semiconductor element.

The spatial light modulation device of the projector 70 is not limited to transmission type liquid crystal display device. The spatial light modulation device may be a reflection type liquid crystal display device (liquid crystal on silicon; LCOS), DMD (digital micromirror device), GLV (grating light valve), or others. The projector 70 is not limited to the structure including the spatial light modulation device for each color. The projector 70 may have one spatial light modulation device which modulates two, three or a larger number of color lights. The projector 70 is not limited to the structure using the spatial light modulation device. The projector 70 may be a laser scan type projector which applies laser beams from a light source device for scanning by using a scanning unit such as galvano-mirror and displays images on a light receiving surface. The projector 70 may be a slide projector which uses a slide containing image information. The projector 70 may be a so-called rear projector which supplies light to one surface of a screen and produces images to be viewed using light released from the other surface of the screen.

Therefore, the light source device according to the invention is appropriately used as a light source for a projector.

The entire disclosure of Japanese Patent Application No. 2008-94758, filed Apr. 1, 2008 is expressly incorporated by reference herein.

What is claimed is:

1. A light source device, comprising:
   a first light source unit which emits a first light;
   a second light source unit which emits a second light; and
   a wavelength conversion element converting a wavelength of the first light into a third light which is emitted from the wavelength conversion element, the wavelength conversion element also converting a wavelength of the second light into fourth light which is also emitted from the wavelength conversion element, the first light and second light being received at different surfaces of the wavelength conversion element which are not coplanar,
   wherein a chief ray of the first light transmitting through the wavelength conversion element is not parallel with a chief ray of the second light transmitting through the wavelength conversion element.

2. The light source device according to claim 1, wherein the first light source unit and the second light source unit emit lights having different wavelengths.

3. The light source device according to claim 1, wherein:
   the wavelength conversion element has a first polarized layer and a second polarized layer disposed side by side in a particular direction; and
   at least either the first light source unit or the second light source unit directs light in a direction different from the particular direction in the wavelength conversion element.

4. The light source device according to claim 3, wherein a first surface as surface receiving light from the first light source unit and a second surface as surface receiving light from the second light source unit on the wavelength conversion element are inclined to the particular direction.

5. The light source device according to claim 3, wherein:
   an incident angle of light from the first light source unit with respect to the wavelength conversion element is set according to the wavelength of the light from the first light source unit; and
   an incident angle of light from the second light source unit with respect to the wavelength conversion element is set according to the wavelength of the light from the second light source unit.

6. The light source device according to claim 1, wherein light emitted from the first light source unit and light emitted from the second light source unit cross each other inside the wavelength conversion element.

7. The light source device according to claim 1, wherein the first light source unit and the second light source unit supply lights to the different surfaces of the wavelength conversion element.

8. The light source device according to claim 7, wherein the first light source unit and the second light source unit supply lights to adjoining surfaces of the wavelength conversion element.

9. The light source device according to claim 1, further comprising a plurality of light source units supplying lights to a common surface of the wavelength conversion element.

10. The light source device according to claim 1, further comprising at least either a first resonating unit which reflects light emitted from the first light source unit and transmitted through the wavelength conversion element and resonates the light from the first light source unit in the space between the first light source unit and the first resonating unit, or a second resonating unit which reflects light emitted from the second light source unit and transmitted through the wavelength conversion element and resonates the light from the second light source unit in the space between the second light source unit and the second resonating unit.

11. The light source device according to claim 10, wherein at least either the first resonating unit or the second resonating unit is provided on the wavelength conversion element.

12. The light source device according to claim 10, further comprising at least either a first bending unit which bends optical path of light traveling from the wavelength conversion element toward the first light source unit after wavelength conversion by the wavelength conversion element, or a second bending unit which bends optical path of light traveling from the wavelength conversion element toward the second light source unit after wavelength conversion by the wavelength conversion element.

13. The light source device according to claim 1, further comprising an optical path conversion unit which converts traveling direction of either light from the first light source unit after wavelength conversion by the wavelength conversion element or light from the second light source unit after wavelength conversion by the wavelength conversion element.

14. The light source device according to claim 1, wherein the first light source unit and the second light source unit supply light traveling substantially in parallel to the wavelength conversion element.

15. A projector comprising the light source according to claim 1 to display an image by using light emitted from the light source device.

* * * * *